Patented Jan. 22, 1952

2,583,076

UNITED STATES PATENT OFFICE 2,583,076

IMBIBITION PRINTING USING DISAZO DYE

John M. Andreas, Pasadena, Calif., assignor to Technicolor Motion Picture Corporation, Hollywood, Calif., a corporation of Maine No Drawing. Application August 23, 1946, Serial No. 692,693

8 Claims. (Cl. 101—149.1)

This invention relates to the imbibition printing of transparent motion picture films and the like, and to the preparation of yellow dyestuffs which are suitable therefor.

It is well known in the color motion picture art that satisfactory yellow dyes are difficult to find and greatly needed, and it is a special requisite in the printing of color motion picture films by imbibition to have dyes which can be dissolved and used in aqueous solutions.

By the present invention, a class of yellow dyes has been prepared which are admirably suited for use by the imbibition method in the motion picture film art and industry, and these dyes have particularly desirable spectral properties in that they can be used to form images in the gelatine layers of photographic films which strongly absorb blue light while transmitting the balance of the visible spectrum with high efficiency.

To this end, it is found that generally the disazo dyes formed by coupling a tetrazotized 4,4'-diamino-stilbene with two mols of an aceto-acetanilide constitute a class of dyestuffs which is especially applicable to the imbibition process for printing motion picture films, giving highly transparent yellow images with spectral absorption characteristics particularly suited to the requirements of three-color work.

The diazotization of 4,4'-diamino-stilbene-2,2' disulfonic acid can be effected with sodium nitrite and hydrochloric acid in cold aqueous solution. The mixture containing the diazo compound is then added to a cold solution of an aceto-acetanilide made alkaline with enough sodium hydroxide or carbonate to make the final reaction product definitely alkaline, so that the coupling takes place in an alkaline medium.

As a typical example, 23 grams of commercial 4,4'-diamino-stilbene-2,2'-disulfonic acid (which is of 80% purity and hence corresponds to about $1/20$ mol) can be dissolved in 100 mls. of water, containing 5 grams of sodium hydroxide previously dissolved therein. The resulting mixture is warmed, and it forms a pale straw-colored solution. It is then filtered to remove insoluble impurities.

The filtrate is cooled (externally, with ice) to below 5° C., and 25 mls. of concentrated hydrochloric acid are added. The 4,4'-diamino-stilbene-2,2'-disulfonic acid is thereby precipitated as a very finely divided lemon-yellow paste. The cold paste is stirred constantly, while 35 mls. of 20% sodium nitrite solution are added slowly thereto. Diazotization is thus effected and is complete after the mixture has stood, with occasional stirring, for about two hours.

Now, 10 grams of sodium hydroxide and 5 grams of sodium carbonate monohydrate are dissolved in 75 mls. of water. To this solution are then added 84 mls. of a 40% solution of commercial sodium aceto-acetyl-p-sulfanilate, which constitutes approximately a 20% excess. The mixture is then cooled to about 5° C.

The cold diazo solution, as above prepared, is then poured slowly into the cold sulfanilate, with continuous stirring so as to obtain good mixing, but without aeration. A thick dye paste is then formed, which should still be strongly alkaline even after the last of the diazo solution has been added. The mixture is kept cool by placing in the usual ice-box.

After the mixture has stood in the ice-box for about two hours, the completeness of the coupling reaction should be tested. This can be done by adding a drop of the reaction mixture to a few mls. of a cold 5% sodium carbonate solution, in which a small amount of "R-salt" was dissolved previously. If no red-violet color is formed, the coupling reaction is complete.

The mixture is now neutralized by adding glacial acetic (approximately 10 mls.) slowly until a slight evolution of carbon dioxide takes place. The mixture is then heated to about 90° C. and allowed to cool slowly to room temperature, as by standing over night. The resulting free dye, which is thus precipitated and has a brownish appearance, is filtered off and can be dried and ground to the desired degree of fineness.

About a 90% yield can be thus obtained, and the resulting product is uniformly and completely soluble in aqueous solutions.

In this way, two mols of sodium aceto-acetyl-p-sulfanilate are coupled with one mol of tetrazotized 4,4' - diamino - stilbene - 2,2' - disulfonic acid, resulting in the formation of a new dyestuff whose sodium salt can be represented by the following structural formula:

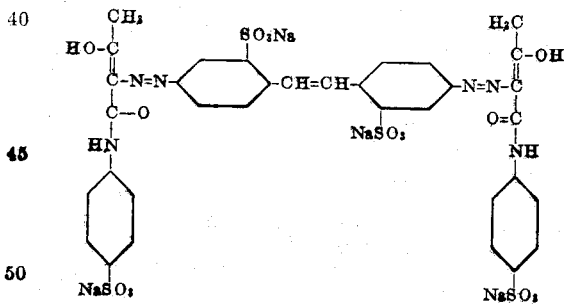

The dye thus prepared may be made up in an aqueous solution of the desired concentration and pH, for example, 0.5 to 5.0 grams per liter, and with a pH range of 2.0 to 7.0. Optimum values of pH vary with the dye, but may be taken as pH 3.5 at a concentration of 3.0 grams per litre as a typical instance. The resulting solution may then be used directly for imbibition purposes satisfactorily.

However, the dye substance as above produced may be further purified, or converted into a different form (such as the potassium salt, or the ammonium salt, or the free acid), or it may be standardized by the addition of a suitable amount of any of various neutral salts (such as sodium chloride, or anhydrous sodium sulfate) which are sometimes added to make a free-flowing, easily soluble, product with predetermined color strength and improved dyeing properties. But usually it will be preferable, to prepare the dyestuff in the form of its neutral sodium salt with a minimum of other impurities or standardizing agents present, and to use it for imbibition purposes in a weakly acid solution.

The application of the dye solution by imbibition may follow the customary mechanical procedure in which the matrix film, or photographic film upon which the corresponding color aspect of the scene to be depicted and reproduced has been recorded as a dye receptive image is passed through the dye bath. It is then rinsed slightly in water. The dyed film, having its developed image-bearing areas selectively and proportionally colored by the dye solution, is then registered with the blank (or partially printed) film, and then firmly and progressively contacted therewith, in intimate face-to-face relationship. This surface-to-surface contact is maintained for an appreciable period of time, though it may be only a matter of seconds, during which the dye from the developed areas of the matrix or printing film migrates therefrom to the blank film by which it is completely adsorbed or absorbed. It forms an accurate reproduction of the developed areas of the matrix film upon the printed film and is imbibed thereby, leaving the matrix substantially or completely free from any dye substance. In this way, the blank film is printed and receives an accurate reproduction, in color, of the dyed portions of the matrix film. It is correct in conformation, color values, densities and distribution, with reference to the same as they appeared in the original scene. This is made manifest by passing white light through the printed film, which is substantially transparent to light in the non-image areas, while the yellow image absorbs blue light (in proportion to the amount of the dyestuff which is present) and transmits red and green light freely.

In yellow dyes to be used for imbibition printing, the attachment of the azo group to the open chain of carbon atoms in aceto-acetanilide (or a derivative of the latter) appears to be very favorable toward the formation of bright colors with desirable fastness and dyeing properties. The presence of at least two (and preferably four) sulfonic acid groups in the molecule as a whole promotes easy solubility in neutral and weakly acid aqueous solutions.

It is now found that particularly good dyes for imbibition purposes can be made by combining two mols of aceto-acetanilide, or a derivative thereof, with a mol of tetrazotized 4,4'-diamino-stilbene-2,2'-disulfonic acid. The solubility of the resulting dyestuff in water will be greater if the aceto-acetanilide is sulfonated than if it is not.

I claim:
1. Method of making motion picture films and the like, by imbibition printing, comprising the step of wetting a photographic surface, having a record of the desired color aspect of the scene to be depicted selectively developed thereon, in a solution of a dis-azo dye, characterized by having as its middle component a 4,4'-diamino-stilbene and as its end components aceto-acetanilide derivatives.

2. Method of making motion picture films and the like, by imbibition printing, comprising the steps of wetting a photographic surface, having a record of the desired color aspect of the scene to be depicted selectively developed thereon, in an aqueous solution of a dis-azo dye, characterized by having as its middle component 4,4'-diamino-stilbene-2,2'-disulfonic acid and as its end components aceto-acetanilide derivatives, and bringing the selectively dyed film into intimate contact with the surface to be printed.

3. Method of making motion picture films and the like, by imbibition printing, comprising the steps of wetting a photographic surface, having a record of the desired color aspect of the scene to be depicted selectively developed thereon, in a weakly acid aqueous solution of a dis-azo dye, characterized by having as its middle component 4,4'-diamino-stilbene-2,2'-disulfonic acid and as its end components two mols of p-sulfo-aceto-acetanilide, and bringing the selectively dyed film into intimate contact with the surface to be printed.

4. Method of making motion picture films and the like, by imbibition printing, comprising the steps of wetting a photographic surface, having a record of the desired color aspect of the scene to be depicted selectively developed thereon, in a solution of a stilbene dye, characterized by being formed by the coupling of one mol of tetrazotized 4,4'-diamino-stilbene-2,2'-disulfonic acid with two mols of p-sulfo-aceto-acetanilide, and bringing the selectively dyed film into intimate contact with the surface to be printed.

5. Motion picture films having in the yellow image thereof a dis-azo stilbene dye, characterized by having an aceto-acetanilide derivative for each of its end components.

6. Motion picture films having in the yellow image thereof a sulfonated dis-azo stilbene dye, characterized by having aceto-acetanilide, non-sulfonated derivative for each of its end components.

7. Motion picture films having in the yellow image thereof a sulfonated dis-azo-stilbene dye, characterized by having a sulfonated aceto-acetanilide derivative for each of its end components.

8. Motion picture films having in the yellow image thereof a sulfonated dis-azo stilbene dye, characterized by having p-sulfo-aceto-acetanilide for each of its end components.

JOHN M. ANDREAS.

REFERENCES CITED

The following references are of record in the file of this patent:

UNITED STATES PATENTS

| Number | Name | Date |
| --- | --- | --- |
| 1,807,805 | Tuttle | June 2, 1931 |
| 1,900,140 | Tuttle | Mar. 7, 1933 |
| 2,009,397 | Goldstein | July 30, 1935 |
| 2,116,355 | Kopp | May 3, 1938 |
| 2,254,395 | Rossander et al. | Sept. 2, 1941 |
| 2,286,838 | Seymour | June 16, 1942 |
| 2,289,714 | Land | July 14, 1942 |
| 2,298,303 | Misslin | Oct. 13, 1942 |
| 2,310,181 | MacKenzie | Feb. 2, 1943 |
| 2,361,567 | Reynolds | Oct. 31, 1944 |